United States Patent [19]
Barrett

[11] Patent Number: 6,121,920
[45] Date of Patent: Sep. 19, 2000

[54] METHOD AND APPARATUS FOR ENHANCING TARGET DETECTION USING POLARIZATION MODULATION

[76] Inventor: Terence W. Barrett, 1453 Beulah Rd., Vienna, Va. 22182

[21] Appl. No.: 09/318,610

[22] Filed: May 26, 1999

[51] Int. Cl.[7] .............................. G01S 13/88; G01V 3/12
[52] U.S. Cl. ................................ 342/188; 342/22; 342/82
[58] Field of Search .............................. 342/188, 22, 73, 342/82, 83, 90, 187, 194, 195, 203, 204

[56] References Cited

U.S. PATENT DOCUMENTS

| | | | |
|---|---|---|---|
| Re. 31,509 | 1/1984 | Neidell | 342/378 X |
| 4,792,231 | 12/1988 | Fried | 356/354 |
| 5,008,611 | 4/1991 | Ulmer, Jr. | 324/96 |
| 5,412,200 | 5/1995 | Rhoads | 250/209.1 |
| 5,486,833 | 1/1996 | Barrett | 342/204 |
| 5,592,177 | 1/1997 | Barrett | 342/361 |
| 5,619,596 | 4/1997 | Iwaki et al. | 382/278 |
| 5,671,090 | 9/1997 | Pernick et al. | 359/561 |
| 6,002,357 | 12/1999 | Redfern et al. | 342/22 |

OTHER PUBLICATIONS

"Coherent FM–CW millimeter–wave radar systems for radar cross–section measurements", Lawner, R.T.; Blanchard, P.F.; Gogineni, S.P., Instrumentation and Measurement Technology Conference, 1989. IMTC–89. Conference Record., 6th IEEE, 1989, pp.: 357–36, 1989.

"On radar polarimetry in FM–CW radar", Yamaguchi, Y.; Nishikawa, T.; Boerner, W.–M.; Sengoku, M.; Hyo Joon Eom, Geoscience and Remote Sensing Symposium, 1993. IGARSS '93. Better Understanding of Earth Environment., International, 1993 ,pp.: 368–370, 1993.

"A Spatial/Spectral Domain Microwave Coal Seam Imaging Sensor Progress In Signal Processing", Chufo, R.L., Mining Electrotechnology Conference, 1994. 12th WVU International, pp: 1–3, 1994.

"Simulation of a polarimetric random noise/spread spectrum radar for subsurface probing applications", Narayanan, R.M.; Xu, Y.; Rhoades, D.W., Geoscience and Remote Sensing Symposium, 1994. IGARSS '94. Surface and Atmospheric Remote Sensing: Technologies, 1989.

Jenkins, F.A. & White, *Fundamentals of Optics*, Fourth Edition, McGraw–Hill, Inc., 1976.

Möller, K.D., *Optics, University Science Books*, Mill Valley, CA.

*Primary Examiner*—John B. Sotomayor
*Attorney, Agent, or Firm*—Jim Zegeer

[57] ABSTRACT

A system of enhancing target detection in a polarization modulated signaling system for detecting targets through one or more given media. A polarization modulated signal is generated and transmitted in the given medium which is the complex conjugate of the polarization modulated response over time of the combined medium and target. The wave equation for transmission through the medium, reflectance from the target and transmission through the one or more given media, is solved and the polarization modulation of the polarization modulated signal is adjusted to match the polarization response over time for maximum propagation through the one or more given media and maximum reflectance from the target over time.

2 Claims, 8 Drawing Sheets

METHOD AND APPARATUS FOR ENHANCING TARGET DETECTION USING POLARIZATION MODULATION

The present invention is an improvement on my U.S. Pat. Nos. 5,486,833 and 5,592,177 and addresses methods for obtaining maximum reflectance from a target with minimum clutter. Whereas my U.S. Pat. No. 5,486,833 achieves this aim by methods using signals of optimum amplitude, frequency and phase modulation in the time and frequency domains, the present invention achieves maximum reflectance from a target with minimum clutter by methods using signals of optimum polarization.

The present invention addresses a method and apparatus in which a signal is matched to the target, or the target and the medium, in order to obtain maximum reflection from the target with minimum clutter.

OBJECT OF THE INVENTION

It is well known for all metals and dielectrics that plane-polarized radiation is not reflected as plane polarized radiation, except when that radiation vibrates either in the plane of incidence or perpendicular to it (c.f. Jenkins & White, 1976; Möller, 1988). Referring to the two vectorial components (or the two planes of vibration) of the electrical field as the p and s components, it is known that these components start together at normal incidence, separate, and then rejoin at the grazing incidence. The corollaries of this statement, which are not well known are:

(1) Specific polarized radiation will be maximally reflected at specific angles of incidence;

(2) At a specific angle of incidence that incident radiation will be maximally reflected over time which is optimally polarized over time.

Therefore, it is an object of the present invention to provide methods addressing (2) and which achieve maximum reflectance from a target, or maximum penetration of a medium, reflectance from a target and return through the medium, by optimization of the polarization modulated components of a signal over time.

SUMMARY OF THE INVENTION

Briefly, the above and other objects of the present invention are achieved in a high accuracy detection system for detecting targets in a given medium comprising means for generating and transmitting in the given medium a signal which is the complex conjugate of the polarization response over time of the combined medium and target and a solution to the wave equation for transmission through the medium, reflectance from the target, and transmission back through the medium. The signals are matched to both the medium and the target over time for maximum propagation through the medium and maximum reflectance from the target over time. The signal match to the medium and target is with respect to polarization response over time.

Methods are described for characterizing the target and medium in terms of the polarization response over time and for designing polarization-modulated signals matched to that response over time. Techniques are described for crafting and launching such matched signals over time. Means are provided for receiving echoes for the signal reflected from targets in a given medium over time. Matched filter means are provided so that the "instantaneous" polarization response over time of the return signal echo from the target are preserved, rather than a matched filter of prior art in which only the average polarization, if only a single, static, polarization response is preserved.

BRIEF DESCRIPTION OF THE DRAWINGS

The above and other objects, advantages and features of the invention will become more clear when considered with the following specification and accompanying drawings wherein.

[1] Lissajous Patterns are the locus of the resultant displacement of a point which is a function of two (or more) simple periodic motions. The usual situation, the two periodic motions are orthogonal (i.e., at right angles) and are of the same frequency. The Lissajous figures then represent the polarization of the resultant wave as a diagonal line, top left to bottom right, or bottom left to top right, in the case of linear polarization, perpendicular and horizontal; a series of ellipses, or a circle, in the case of circular polarization corotating and contrarotating, all of these corresponding to the possible differences in constant phase between the two simple periodic motions. If the phase is not constant, but is changing or modulated, as in the examples considered in the present invention, then the pattern representing the phase is constantly changing over the time the Lissajous figure is generated. Named after Jules Lissajous (1822–1880).

Figure 2:
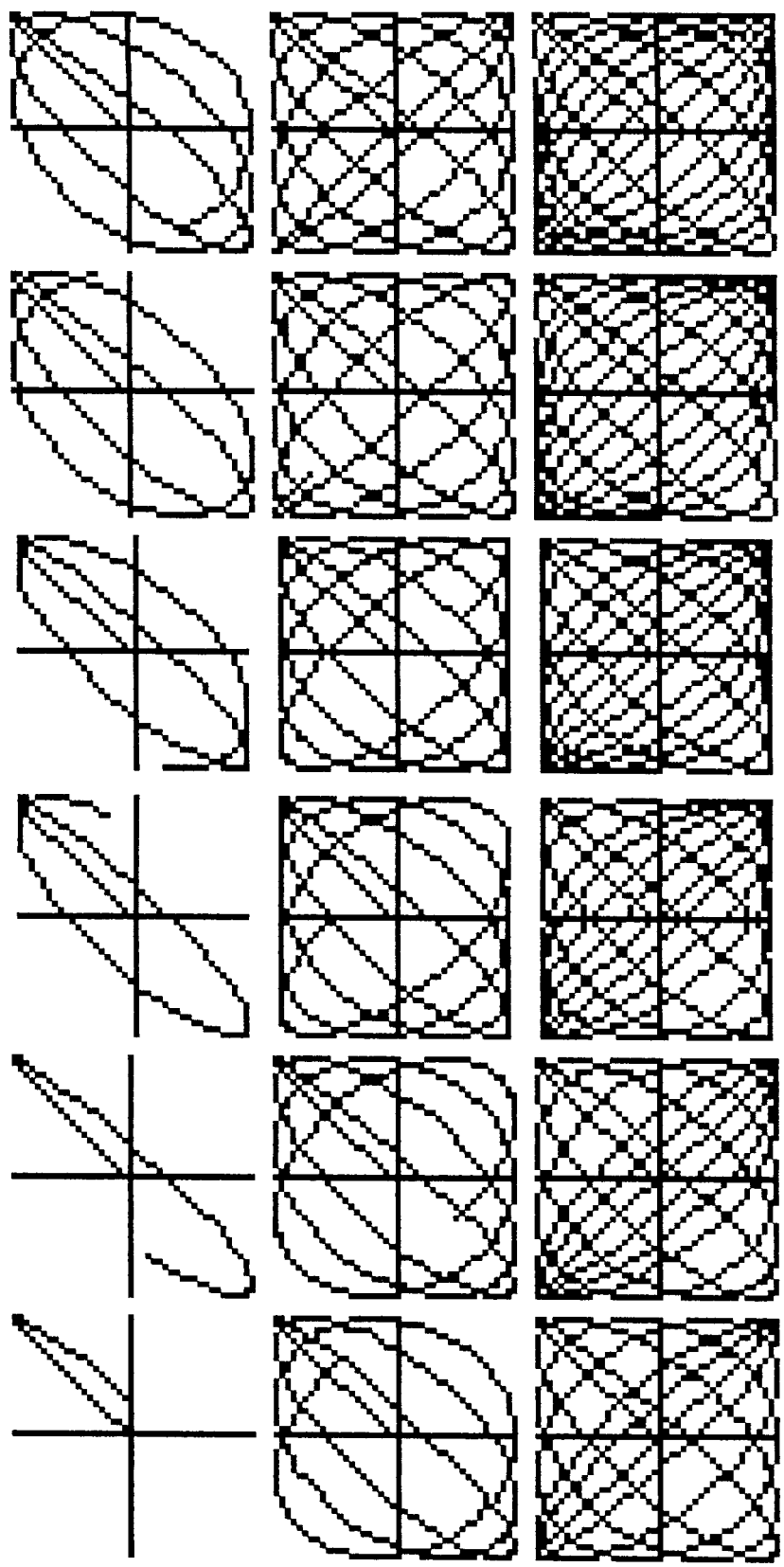

FIG. 2. Lissajous patterns representing the polarized electric field over time, viewed in the plane of incidence resulting from the two orthogonal s and p fields. The p field is phase modulated at a rate $d\phi/dt=0.1$ t. In these Lissajous patterns the plane polarizations are presented at 45 degrees to the axes.

Figure 3:
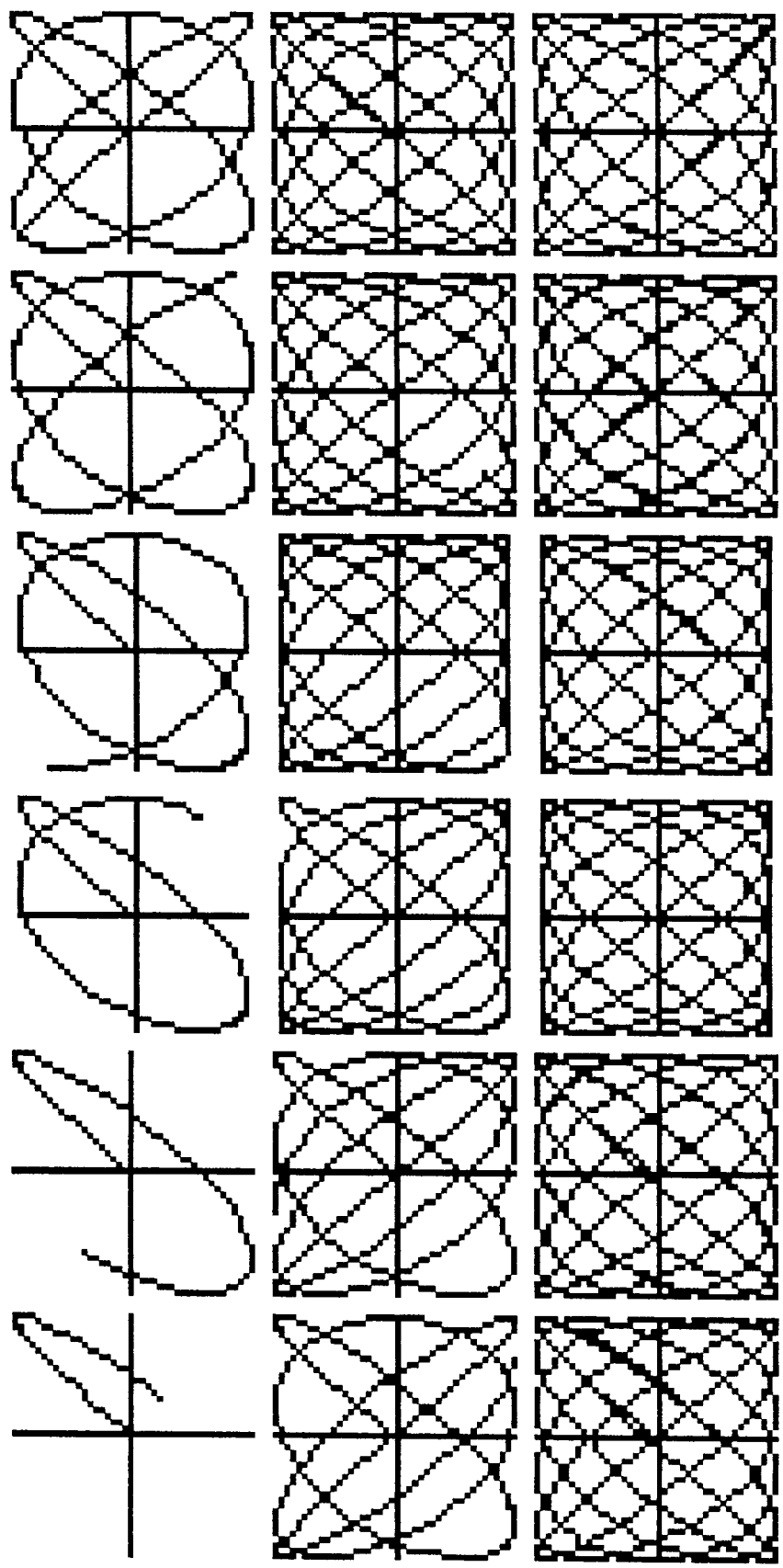

FIG. 3. Lissajous patterns representing the polarized electric field over time, viewed in the plane of incidence resulting from the two orthogonal s and p fields. The p field is phase modulated at a rate $d\phi/dt=0.2$ t. In these Lissajous patterns the plane polarizations are represented at 45 degrees to the axes.

Figure 4:
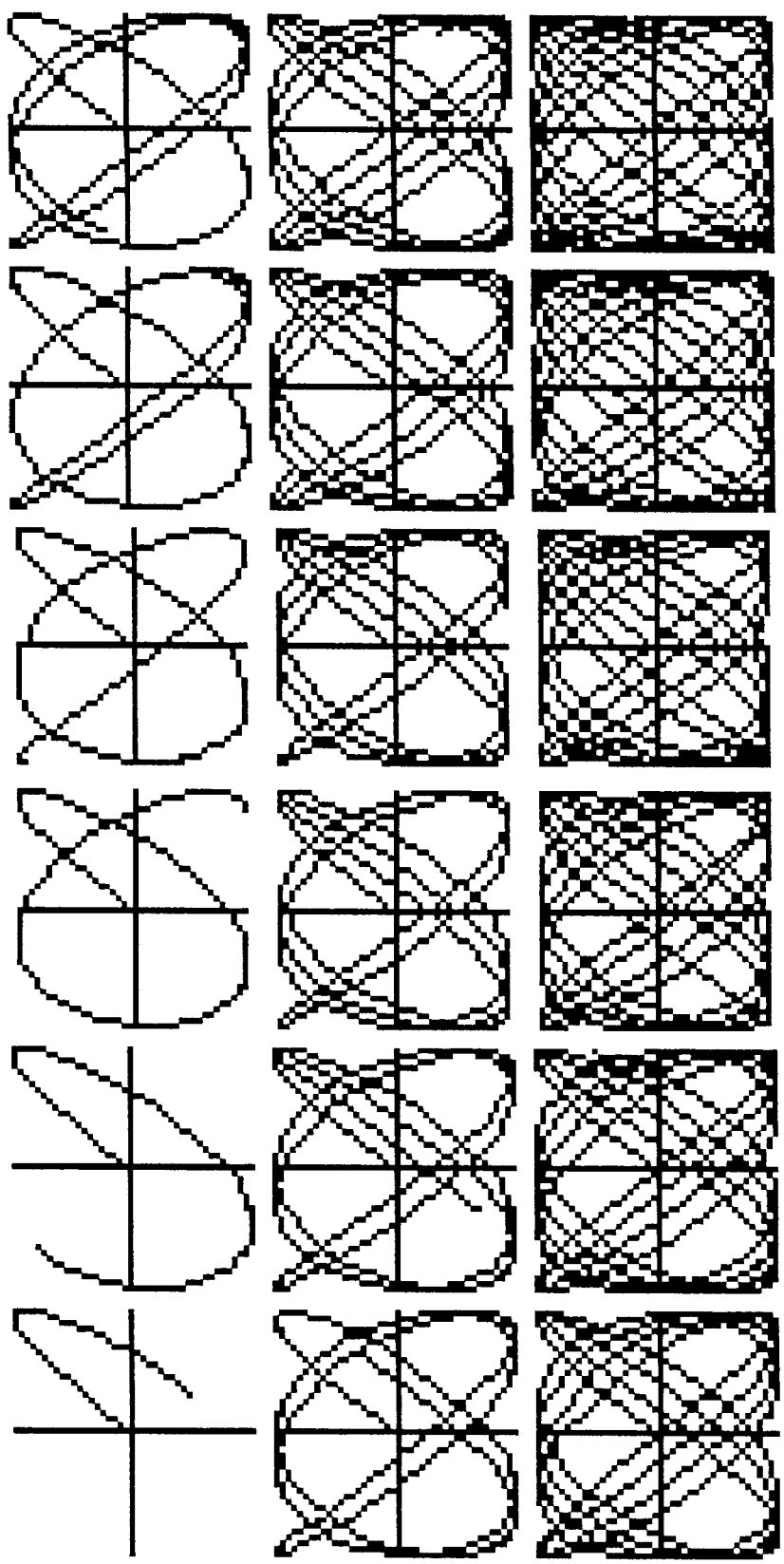

FIG. 4. Lissajous patterns representing the polarized electric field over time, viewed in the plane of incidence resulting from the two orthogonal s and p fields. The p field is phase modulated at a rate of $d\phi/dt=0.3$ t. In these Lissajous patterns the plane polarizations are represented at 45 degrees to the axes.

Figure 5:
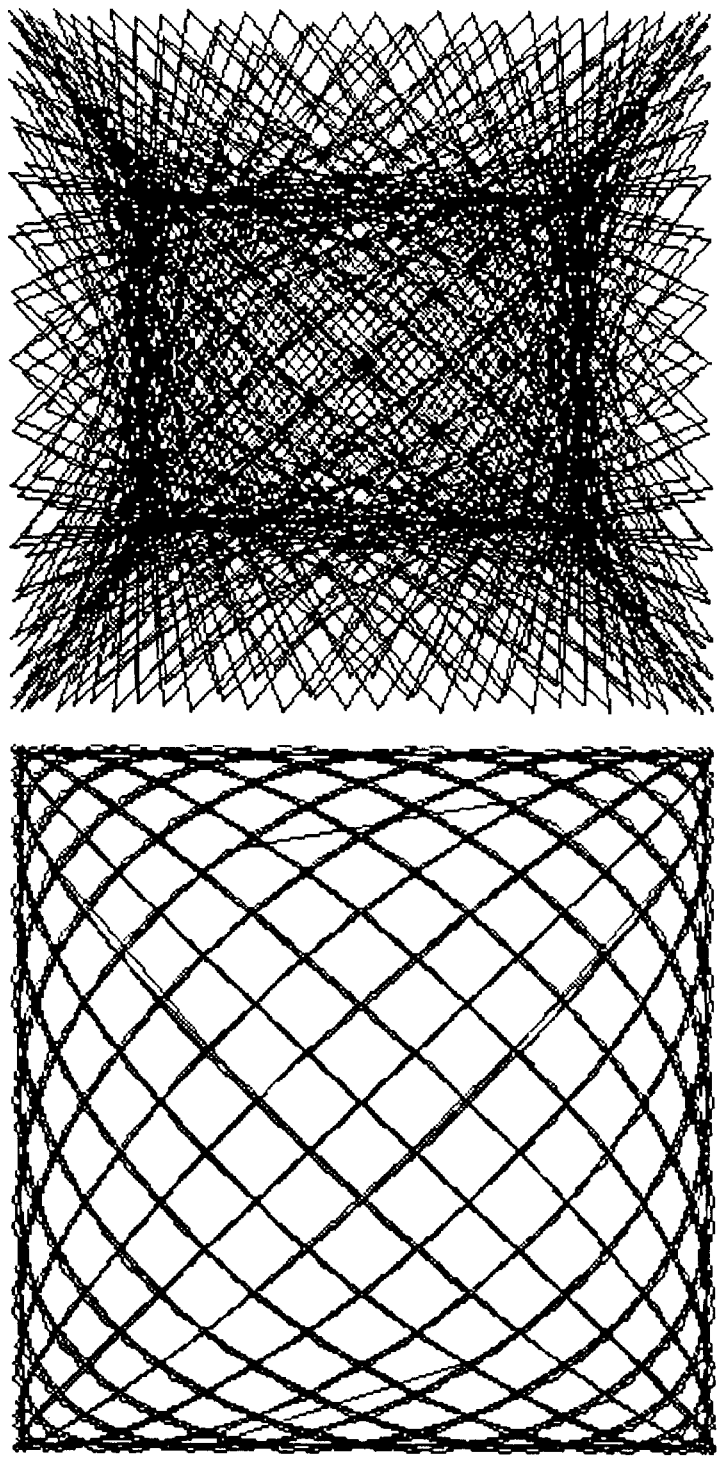

FIG. 5. Lissajous patterns representing the polarized electric field over time, viewed in the plane of incidence resulting from the two orthogonal s and p fields. The p and s fields are $\sin[t]$. The p field is phase modulated at a rate $d\phi/dt=0.1$ t. The left figure is the total polarization trajectory pattern over 100 $\pi$; the right figure is the total polarization trajectory over 1000 $\pi$. In these Lissajous patterns the plane polarizations are represented at 45 degrees to the axes.

Figure 6:
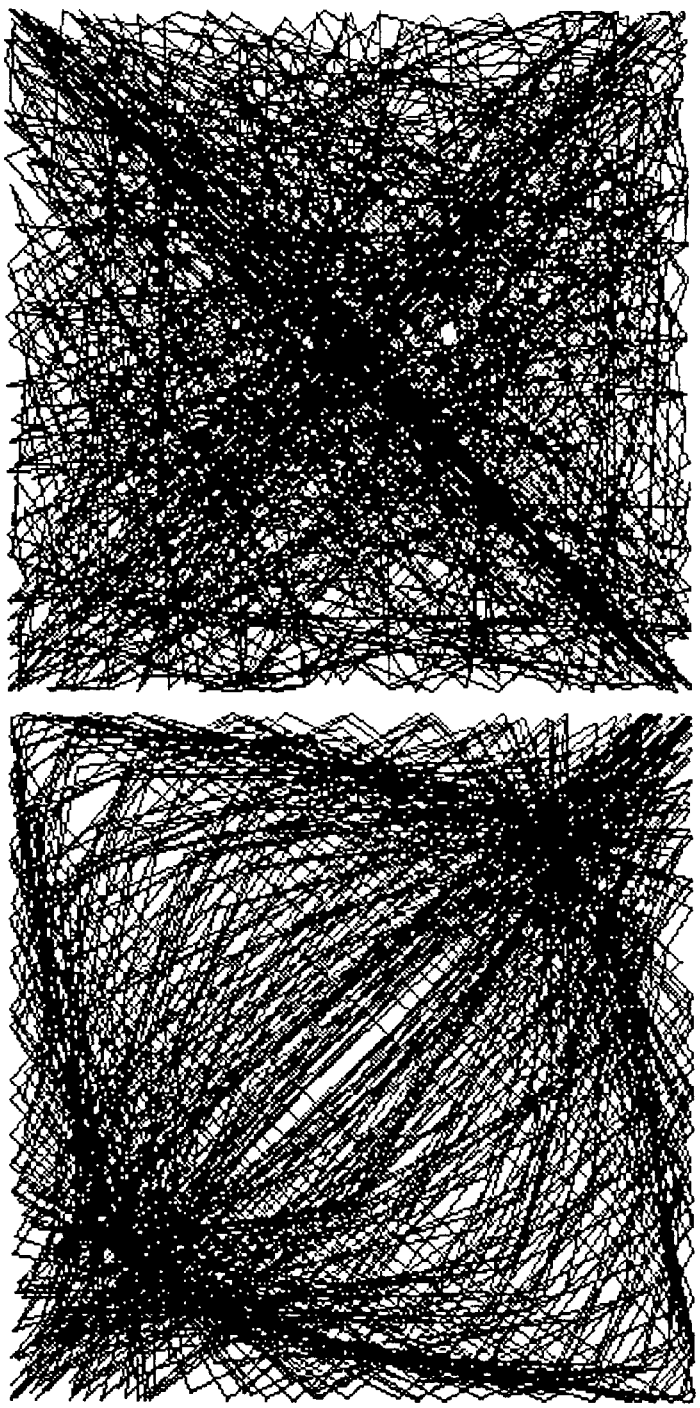

FIG. 6. Lissajous patterns representing the polarized electric field, viewed in the plane of incidence resulting from the two orthogonal s and p fields. The p and s fields are $\sin[t^2]$. The p field is phase modulated at a rate $d\phi/dt=0.1$ t. The left figure is the total polarization trajectory pattern over 10 $\pi$; the right figure is the total polarization trajectory over 100 $\pi$. In these Lissajous patterns the plane polarizations are represented at 45 degrees to the axes.

Figure 7:
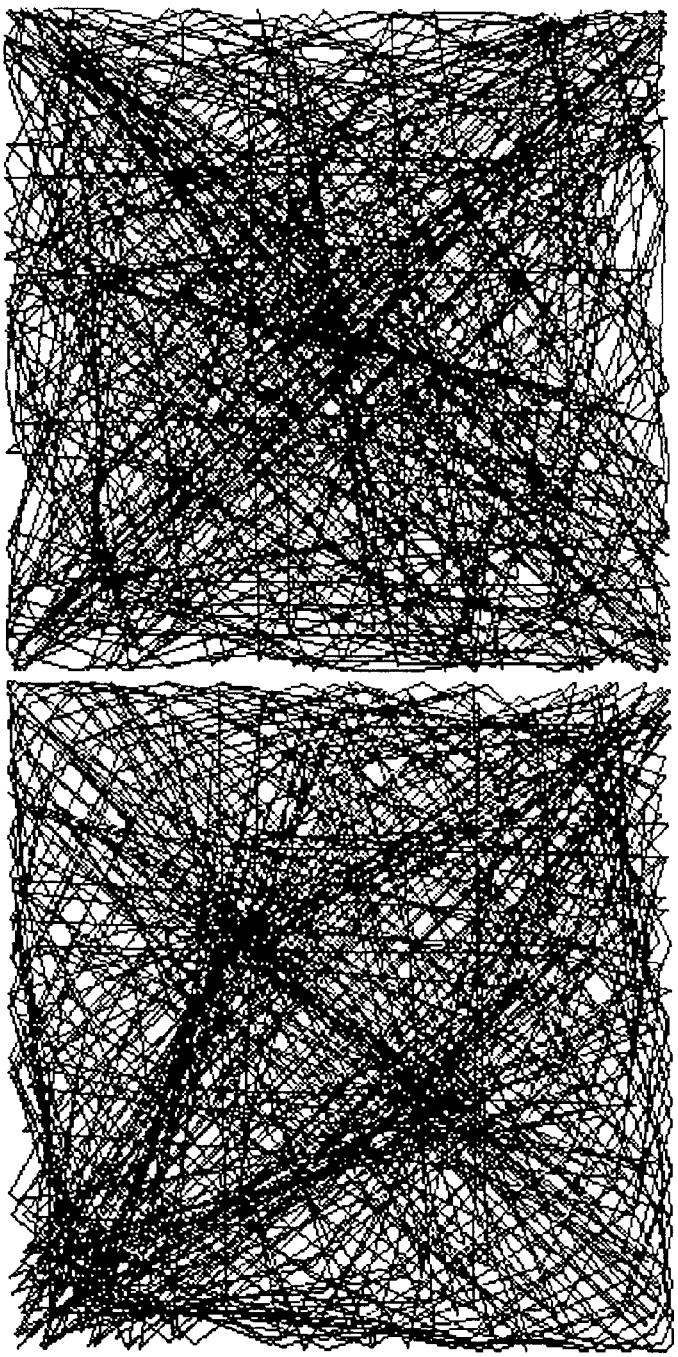

FIG. 7. Lissajous patterns representing the polarized electric field over time, viewed in the plane of incidence resulting from the two orthogonal s and p fields. The s and p fields are $\sin[t^3]$. The left figure's p field is phase modulated at a rate $d\phi/dt=0.1$ $t^2$; the right figure's p field is phase modulated at a rate $d\phi/dt=0.5$ $t^2$. For both figures, the total polarization trajectory pattern over 4 $\pi$. In these Lissajous patterns the plane polarizations are represented at 45 degrees to the axes.

Figure 8:
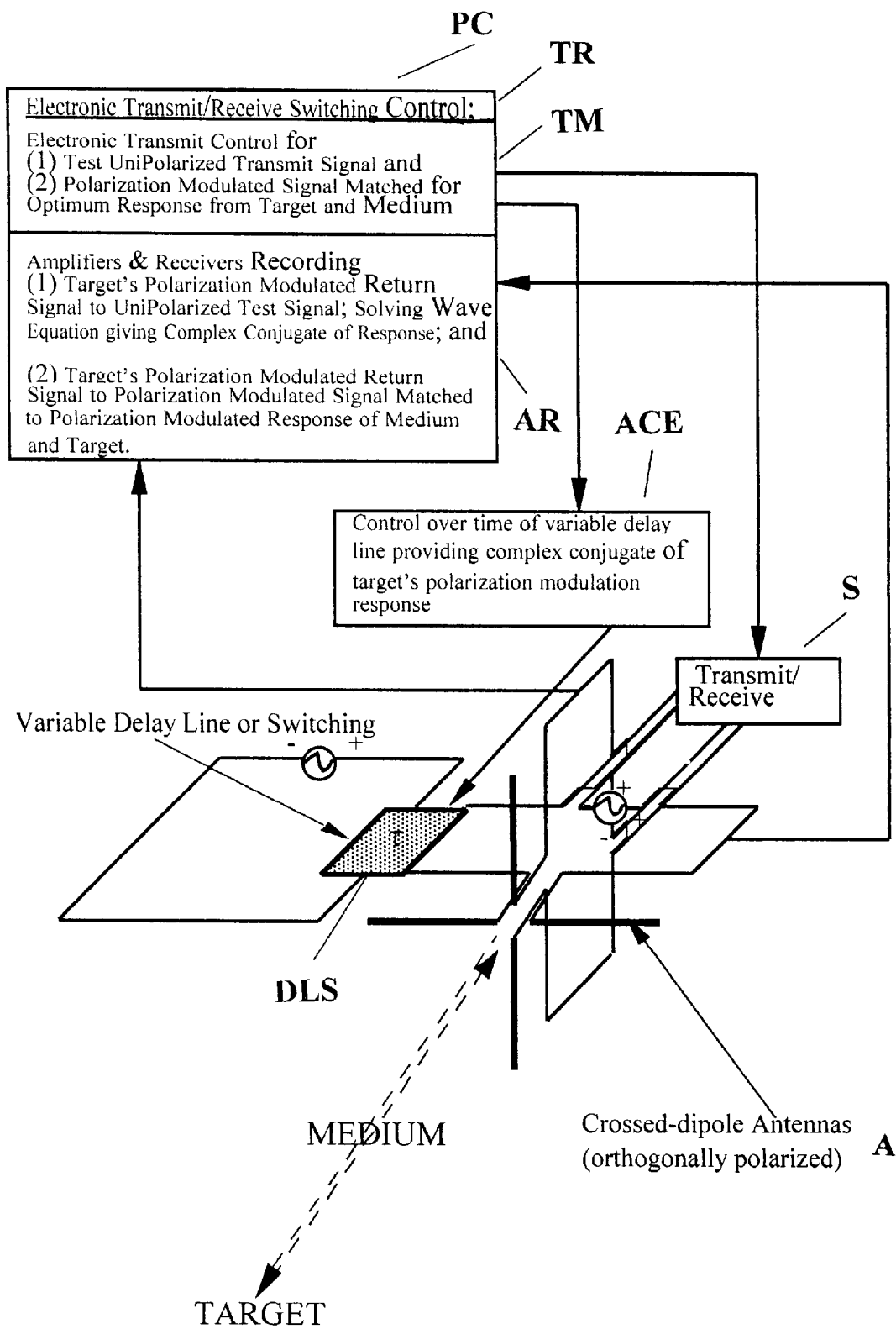

FIG. 8. A dual-feed crossed polarized antenna system based on a narrow bandwidth (vertically polarized) component and a broad bandwidth phase modulated (horizontally polarized) component. In an alternative configuration, both antennas are medium bandwidth and both circuits are phase modulated.

DETAILED DESCRIPTION OF THE PREFERRED EMBODIMENT

Figure 1:
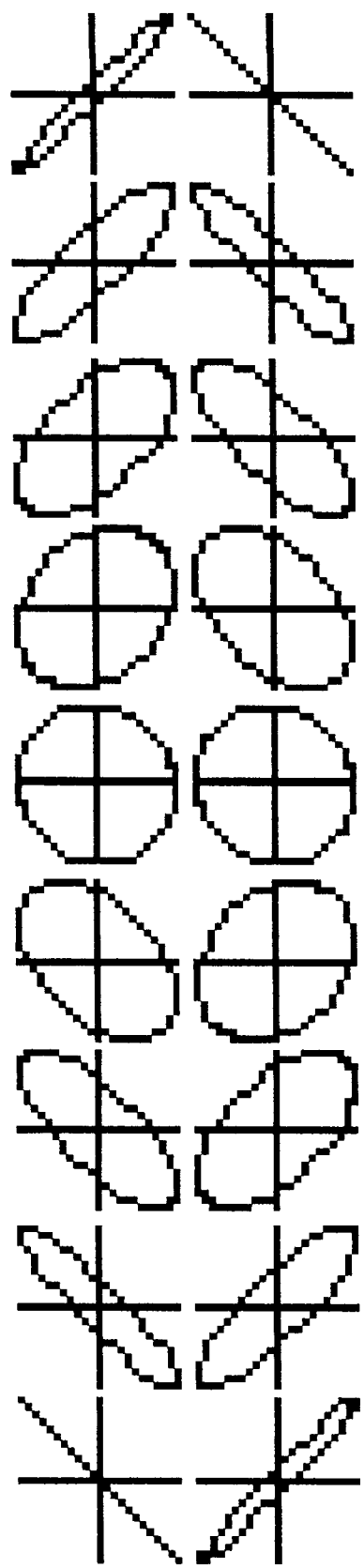
FIG. 1. Lissajous patterns[1] of representing the polarized electric field over time, viewed in the plane of incidence, resulting from the two orthogonal s and p fields which are out of phase by the following degrees: 0, 21, 42, 64, 85, 106, 127, 148, 169 (top row); 191, 212, 233, 254, 275, 296, 318, 339, 360 (bottom row). In these Lissajous patterns the plane polarizations are represented at 45 degrees to the axes.

The present invention is based on the transmission of polarization modulated signals which are matched in polarization over time to the medium and target. FIGS. 1 to 7 are Lissajous patterns (see Footnote No. 1) of polarization modulated signals. FIG. 1 shows "snapshots" of a polarization modulated—as opposed to a set, static, polarized—signal over time, those transmitted signals being formed at the antenna by orthogonally polarized s and p signals (cf. FIG. 8). FIGS. 2 to 7 shows examples illustrating the variety of polarization modulated—as opposed to set, static, polarized—signals which can be obtained. It can be seen that just as "white light" or completely depolarized signals differ from polarized light, so do polarization modulated signals, over time, differ from a set, static, polarized signal, whether that signal be a linearly, circularly or elliptically polarized signal.

In one preferred embodiment, a polarization modulated signal will be transmitted from orthogonally polarized antennas (FIG. 8), with the returned signal also being received at orthogonally polarized antennas. Two situations of use are envisaged: the a posteriori and the a priori situations. In the case of the a posteriori situation and using well known homodyne or heterodyne receiver methods and cross-correlation, the transmit signal will be maximally polarization modulated (i.e., approaching "white" polarization over time) and the return signal correlated over time with the instantaneous polarizations over time, which achieve the maximum designated target response. The optimum polarization modulated signal will then be designed and transmitted to achieve that maximum designated target response with minimum clutter. In the case of the a priori situation, the methods of the a posteriori situation are already used to obtain prior knowledge of the appropriate polarization modulated signal to use to achieve maximum reflectance over time from a designated target. Thus, the crafted polarization modulated signal matched to the target in both the a posteriori and a priori situations will be neither "white" polarization modulated, nor a set polarization static over time (e.g., linear, circular or elliptical), but specifically and uniquely polarization modulated over time to match the polarization response of designated target(s) or classes of targets over time.

Finally, the polarization modulated signal over time, which is matched to set target(s) and/or media, is modulated over a time scale which can be either extremely short in time, or long in time, that time scale depending on the target and the medium through which the signal must pass.

Referring again to FIG. 8, orthogonally polarized antennas, which in this embodiment are crossed dipole antennas A, are controlled to serve as transmitting antennas or receiving antennas by switch S, which is controlled by signals from the electronic transmit/receive switching control module TR in processor controller PC. A second module TM fashions: (1) a test unipolarized transmit signal, and (2) the polarization modulated signal matched for optimum response from the target and medium.

The returned signals from the target, e.g. echoes, which result from the unipolarized pulses are received by the crossed dipole antennas A when TR switch S is in the receive condition, amplified in module AR and (1) wave equation solved giving complex conjugate of the response and (2) the target's polarization modulated return signal to polarization modulated signal is matched to polarization modulated response of medium and target. Processor controller PC outputs the polarization matched signal to antenna signal control element ACE which provides a signal to the variable delay line or switching network DLS to exert control over time of variable delay line DLS, thereby providing the complex conjugate of the target and medium (two-way travel) polarization modulation response.

This invention addresses applications at any wavelength of signal, whether electromagnetic or acoustic.

While the invention has been described in relation to preferred embodiments of the invention, it will be appreciated that other embodiments, adaptations and modifications of the invention will be apparent to those skilled in the art.

What is claimed is:

1. A method of enhancing target detection in a polarization modulated signaling system for detecting targets through one or more given media, comprising:

generating and transmitting a polarization modulated signal in said given media which is the complex conjugate of the polarization modulating response over time of the combined media and target, solving the wave equation for transmission through said media, reflectance from said target and transmission through said one or more given media, and adjusting the polarization modulation of said polarization modulated signal to match said polarization response over time for maximum propagation through the one or more given media and maximum reflectance from the target over time.

2. Apparatus for enhancing target detection in a polarization modulated signaling system for detecting targets through one or more given media, means for generating and transmitting a polarization modulated signal in said given media which is the complex conjugate of the polarization modulated response over time of the combined media and target, means for solving the wave equation for transmission through said media, reflectance from said target and transmission through said media, and means for adjusting the polarization modulation of said polarization modulated signal to match said polarization modulating response over time for maximum propagation through the media and maximum reflectance from the target over time.

\* \* \* \* \*